A. FAVREAU.
POTATO-DIGGER.

No. 182,811. Patented Oct. 3, 1876.

Witnesses.
E. J. Bennett
J. C. Mutt.

Inventor.
Antony Favreau.
by Wm. H. Low
Attorney

UNITED STATES PATENT OFFICE.

ANTONY FAVREAU, OF HOLYOKE, MASSACHUSETTS, ASSIGNOR TO JOSEPH FAVREAU, OF SAME PLACE.

IMPROVEMENT IN POTATO-DIGGERS.

Specification forming part of Letters Patent No. 182,811, dated October 3, 1876; application filed July 20, 1876.

*To all whom it may concern:*

Be it known that I, ANTONY FAVREAU, of Holyoke, in the county of Hampden and State of Massachusetts, have invented certain new and useful Improvements in Potato-Diggers, of which the following is a full and exact description, reference being had to the accompanying drawing, making a part of this specification, in which—

Figure 1:
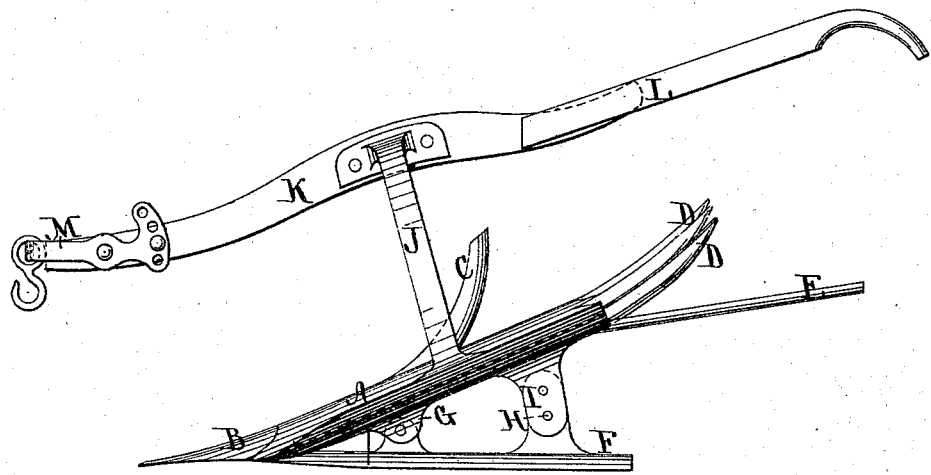
Figure 2:
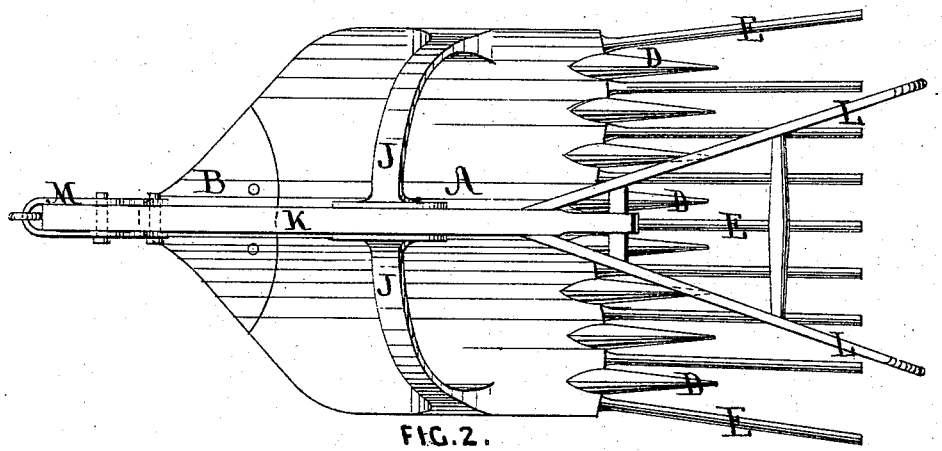

Figure 1 is a side elevation, and Fig. 2 a plan view, of my improved implement.

My invention consists of a plow of peculiar construction, provided with the various devices herein shown and described for the purpose of rendering it a simple and efficient implement for raising and breaking up the soil and separating the potatoes therefrom.

As shown in the drawing, A is the plow, made of either sheet or cast metal, approximating in shape the form of a shield. Its cross-section presents at its center a convex line, which, changing at each edge to a concave, gives to the plow a shallow corrugated surface. Its entering point B is narrowed down, so as to facilitate the penetration of the plow into the soil. This point may be made detachable, as shown in the drawing, or it may constitute a fixed part of the plow.

On the upper surface of the plow, on its central line, a curved cutter, C, is fixed for the purpose of opening the top soil of the hills, and for cutting and removing the potato-vines at its rear end. The plow is provided with a series of curved spurs or clod-breakers, D, which rise slightly above the face-line of the plow for the purpose of breaking up the soil passing over the plow, so as to free the potatoes therefrom. Beneath these clod-breakers, and alternating with them, is a series of separating-rods, E, secured to the plow, and slightly deflecting downward from the face-line of it. These rods are for the purpose of perfecting the removal of the potatoes and breaking up the soil. The adjustable shoes F are pivoted to the lugs G on the under side of the plow A, and by means of the pins H, inserted in the holes of the lugs I, they can be adjusted to vary the inclination of the face of the plow, so as to adapt it to the different degrees of penetration into the soil that may be required. These shoes, while the implement is in use, slide upon the bottom of the furrow made by the plow, and sustain it in its proper position. Attached to the face of the plow, at each edge, and near the center of its length, are the arched braces J, by means of which the plow is secured to the beam K, which is provided with the handles L and an adjustable clevis, M. These latter-named parts are made in the form, and for the purposes, of similar parts of the common plow.

This implement operates as follows: The animal power for hauling it is fastened to the beam of the plow in the usual manner, and, when in motion, the point B penetrates the hills of potatoes. The soil holding the potatoes, in passing over the face of the plow A, is subjected to the action of the cutter C, as hereinbefore described, after which it passes to the clod-breakers D and separating-rods E, which thoroughly break up and disintegrate the soil and loosen the potatoes therefrom, leaving them in a condition to be readily gathered.

I claim as my invention—

The combination, with the plow A, provided with the cutter C, clod-breakers D, and separating-rods E, of the adjustable shoes F, as and for the purpose herein specified.

his
       ANTONY  ×  FAVREAU.
                      mark.

Witnesses:
   H. L. SHERMAN,
   ISAAC PERRY.